Jan. 22, 1963     D. ALTENPOHL     3,074,857
METHOD AND APPARATUS FOR PRODUCING DIELECTRIC LAYER ON
THE SURFACE OF AN ALUMINUM FOIL
Filed Nov. 18, 1958
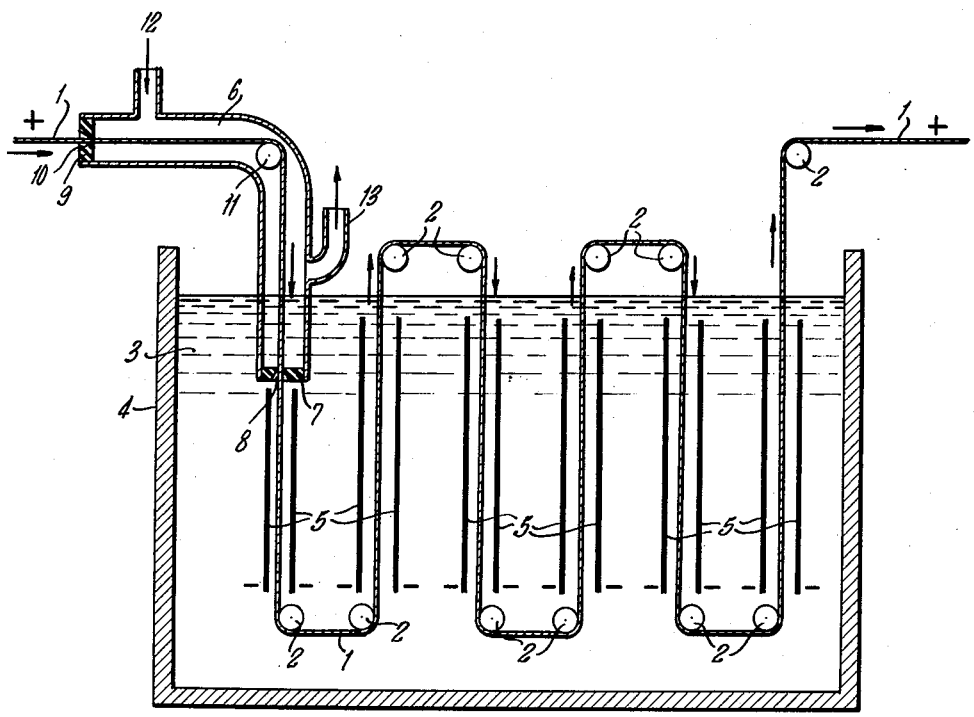
INVENTOR.
Dietrich Altenpohl
BY
ATTORNEYS

United States Patent Office 3,074,857
Patented Jan. 22, 1963

3,074,857
METHOD AND APPARATUS FOR PRODUCING DIELECTRIC LAYER ON THE SURFACE OF AN ALUMINUM FOIL
Dietrich Altenpohl, Jackson, Tenn., assignor to Aluminium-Walzwerke Singen G.m.b.H., Singen, Hohentwiel, Germany, a company limited of Germany
Filed Nov. 18, 1958, Ser. No. 774,710
Claims priority, application Germany Nov. 23, 1957
2 Claims. (Cl. 204—28)

This invention relates to a process and apparatus for treating aluminum foil intended for use as an electrode of an electrolytic capacitor and, more particularly, to a process and apparatus for forming a dielectric layer on the surface of the aluminum foil.

In conventional processes for making electrodes for electrolytic capacitors, the aluminum foil is treated in a series of steps which include passing the aluminum foil in web form through an etching bath to multiply the surface area of the foil and thereafter subjecting the etched surface to an electrolytic treatment in which an oxide layer or coating having dielectric properties is formed on the etched surface by anodic oxidation of the foil.

In the electrolytic treatment during which the dielectric layer is formed on the etched surface of the aluminum foil, the aluminum foil is fed in web form through one or more baths containing an electrolyte and an electric potential is impressed between a cathode immersed within the electrolytic bath and the aluminum foil, which serves as the anode. In this treatment, oxygen is liberated from the surface of the aluminum foil, depositing a dielectric layer or coating of oxide thereon. The liberation of this oxygen produces vapor bubbles which tend to rise to the surface of the electrolytic bath, producing a concentration of vapor bubbles at the upper level of the bath immediately below the surface. This concentration of vapor bubbles at the upper level of the bath resists the passage of the film forming current so that the full forming voltage is effective in the formation of the dielectric layer only at the lower depths of the electrolyte. Therefore, when the aluminum foil is first immersed below the surface of the electrolytic bath, the film formation begins with a relatively low and uncontrolled current intensity. This interference with the initial formation of the dielectric layer of the aluminum foil has a detrimental influence on the power factor of the capacitor made therefrom.

Another factor in the treatment of aluminum foil which has an adverse effect on the electrolytic capacitors made therefrom is the hydrated oxide layer of irregular thickness which is unintentionally produced on the etched surface of the aluminum foil before the dielectric film forming operation by the hot vapors rising from the electrolytic bath. This initial oxide film prevents the sudden application of the full current intensity on the surface of the foil upon introduction into the electrolytic bath which is essential to the proper formation of the dielectric layer or coating.

The present invention is directed to a method and apparatus for isolating the etched aluminum foil from the anodizing action of the current, particularly at the point at which the aluminum foil is first introduced into the bath and until the aluminum foil is at a sufficient depth below the level of the electrolytic bath so that the initial current intensity to which the aluminum foil is subjected will not be impeded, such as, for example, by the higher concentration of gas bubbles which accumulate at the upper level. The present invention is also directed to a method and apparatus for isolating the etched aluminum foil from the vapor evolved from the electrolytic bath before the foil is introduced into the bath.

For a complete understanding of the present invention, reference may be made to the detailed description which follows, and to the accompanying drawing in which the apparatus of the present invention is illustrated in a cross-sectional elevational view.

Referring to the drawing, a strip 1 of etched aluminum foil is guided by a plurality of rollers 2 through an electrolytic bath 3 contained within a receptacle 4. The etched aluminum foil on which the oxide layer is to be formed can be furnished with its etched surfaces virtually free of oxides or with a protective layer of amorphous or hydrated oxide, for example, a boehmite layer. Aluminum foil which is to be used in the high voltage capacitors, except those used for starting motors, is preferably coated with an amorphous or hydrated oxide layer before forming the dielectric layer. However, the aluminum foil which is to be used in low voltage capacitors and capacitors to be used for motor starters is provided with but a thin layer of natural oxide before the dielectric layer is formed.

The electrolytic bath is a hot or boiling aqueous solution of boric acid in which the concentration of boric acid is in the range of from 5% to 15%. A plurality of pairs of vertically disposed cathodes 5 are immersed in the bath. The etched aluminum foil in passing through the electrolytic bath 3 travels downwardly between a first pair of cathodes and then upwardly between a second pair of cathodes, then downwardly between a third pair of cathodes, etc. A potential is impressed between the aluminum foil, which serves as the anode, and the cathode to accelerate the film forming process. This voltage can be a D.C. voltage between 3 and 700 volts. At a voltage of about 500 volts, the current intensity will be in the order of about 15 amperes per cm. of width of the aluminum foil strip. At lower forming voltages the current intensity is proportionately lower. However, the conductivity of the electrolyte can be increased by introducing certain additives to the bath. From time to time, the formation of the dielectric layer is interrupted by bringing the aluminum foil above the surface of the electrolytic bath for the purpose of liberating gas bubbles which might otherwise be entrapped within the deep pores etched in the surface of the aluminum foil.

A vigorous relative movement between the electrolyte and the aluminum foil will facilitate release of the vapor bubbles from the surface of the aluminum foil, particularly bubbles which would interfere with the formation of the oxide layer and which might otherwise be retained in porous cavities of the etched surface. This relative motion between the foil and the electrolyte should be at least one meter per minute, and preferably above ten meters per minute.

According to the present invention, the etched aluminum foil is conducted through a protective channel or shield tube 6 which serves the dual purpose of affording protection for the foil above the bath from the vapors given off which tend to oxidize the surface of the foil prematurely and isolating the foil from the anodizing action of the current in the bath until the foil passes below the gas bubbles which accumulate near the surface of the bath. The foil is isolated from the anodizing action of the current at the upper level of the bath by the lower end of the protective channel 6 which extends beneath the surface of the bath. The extreme lower or discharge end of the channel is provided with an end closure 7 having a slot 8 formed therethrough. The end closure 7 may, for example, be a slotted rubber disc or a rubber packing. The end closure may or may not prevent the liquid from rising into that portion of the channel 6 which projects beneath the level of the electrolytic bath. Inasmuch as the concentration of the vapor bubbles below the discharge end of the channel 6 is substantially less than in the zone between the discharge end of the channel and the surface of the electrolytic bath, and inasmuch as the foil is not subjected to the influence of the electric current until it passes through the end closure 7, the rate of formation of the dielectric layer on both surfaces of the aluminum foil proceeds initially at a much faster rate than it would proceed if carried on in the presence of a concentration of vapor bubbles.

The depth to which the protective channel 6 penetrates the electrolytic bath depends to a large extent on the depth of the concentration of gas bubbles within the bath. Since the concentration of gas bubbles is greater near the surface of the bath, virtually any depth of penetration of the channel will improve the quality of the electrode thus produced. In some cases, this depth of penetration need be but a short length, say one centimeter; in other cases, the depth of penetration may preferably be much deeper, say five to thirty centimeters, perhaps even one meter. A channel which extends deeply into the electrolyte favors heat concentration within the bath and therefore the quick rising of the bubbles. Because of the penetration of the protective channel, the effective length of the first pair of cathodes 5 is somewhat foreshortened, but this is of little significance in comparison to the importance of carrying on the initial film forming operation in the presence of a high current intensity between the aluminum foil and the cathodes.

The formation of the protective channel above the level of the bath protects the aluminum foil from the vapors evolved from the bath 3. The upper end of the channel extends laterally so that the inlet end of the channel extends at least beyond the upper edge of the tank or receptacle 4. The inlet end of the channel is provided with a slotted end closure 9 having a slot 10 formed therein. The end closure is substantially identical to the end closure 7 at the discharge end of the tube. Because of the bend in the protective channel, a guide roller 11 is mounted therein.

The protective channel is provided with an inlet conduit 12 near the inlet end thereof and an upwardly turned discharge conduit or vent 13 downstream thereof near the surface of the electrolytic bath, so that an inert gas, preferably cool air, can be circulated under pressure in the portion of the protective channel or tube above the level of the liquid. This flow of air carries out the vapors emerging from the electrolyte around the foil if the electrolyte is not excluded from the lower end of the protective channel by the end closure 7.

The protective channel 6 may be made from a plastic or other insulating material or it may be made of a metal, say aluminum or stainless steel, and function as a Faraday screen, in which case the metal tube will be grounded. However, if it is made of aluminum, it may be charged positively so that there will be no flow of current within the protective channel between the foil and the cathodes 5.

If the aluminum foil is covered with an oxide layer, such as a protective hydrated oxide layer, of more than 0.05 micron before being introduced into the bath 3, the portion of the protective channel above the level of the bath is unnecessary. However, it will not cause damage to the protective layer, so that the same shield tube or channel can be used both for foils with or without a protective hydrated oxide layer.

The invention has been shown in preferred form and by way of example only, and obviously many variations and modifications may be made therein without departing from the spirit of the invention. For example, the upper portion of the protective channel can be eliminated if it is unnecessary to protect the aluminum foil from the effect of vapors evolving from the bath. The invention, therefore, is not to be limited to any specific form or embodiment, except in so far as such limitations are expressly set forth in the claims.

I claim:

1. A process for forming a dielectric layer on the surface of an aluminum foil to be used in an electrolytic capacitor comprising the steps of feeding a web of the aluminum foil through an electrolytic bath in which the surface of the aluminum foil is subjected to anodization by a flow of current to form an oxide layer on the surface of the aluminum foil, from which bath vapors are evolved which tend to impart undesirable initial oxidation to the foil before it enters the bath and in the upper region of which electrolytic bath gas bubbles tend to concentrate just below the surface, the web being introduced into the electrolytic bath from above, isolating that portion of the foil above the electrolytic bath from premature oxidation caused by oxidizing vapors, including vapors evolved from the electrolytic bath, isolating a length of the aluminum foil beneath the surface of the bath from premature oxidation and the effect of the flow of current until it has descended beneath the surface of the electrolytic bath and below the concentration of gas bubbles near the surface of the electrolytic bath to a depth and to a region within the electrolytic bath at which the foil is surrounded by full strength electrolyte, and subjecting the aluminum foil when it reaches said depth and said region at which it is surrounded by and in the presence only of full strength electrolyte, and not beforehand, to the full current flow in undilute electrolyte, so that the initial anodization of the foil is by full current flow in full strength electrolyte.

2. A process for forming a dielectric layer on the surface of an aluminum foil to be used in an electrolytic capacitor comprising the steps of feeding a web of the aluminum foil through an electrolytic bath in which the surface of the aluminum foil is subjected to anodization by a flow of current to form an oxide layer on the surface of the aluminum foil, from which bath vapors are evolved which tend to impart undesirable initial oxidation to the foil before it enters the bath and in the upper region of which electrolytic bath gas bubbles tend to concentrate just below the surface, the web being introduced into the electrolytic bath from above, isolating that portion of the foil above the electrolytic bath from oxidizing vapors, including vapors evolved from the electrolytic bath, isolating a length of the aluminum foil below the level of the electrolytic bath from the effect of the flow of current until it has descended below the surface of the electrolytic bath and below the concentration of gas bubbles near the surface of the electrolytic bath, said isolation steps being carried out by feeding the foil through a protective tube which has slotted passages at both ends, subjecting the foil within the tube to an inert gas flowing in a downstream direction to eliminate the upstream flow of vapors evolved from the electrolytic bath, and subjecting the aluminum foil when it reaches a depth below the concentration of gas bubbles and at which it is surrounded by full strength electrolyte to the full current flow in undiluted electrolyte.

References Cited in the file of this patent

UNITED STATES PATENTS

| | | |
|---|---|---|
| 1,068,411 | Chubb | July 29, 1913 |
| 1,069,151 | Loewenthal | Aug. 5, 1913 |
| 1,590,599 | Taylor | June 29, 1926 |
| 1,862,138 | Elsey | June 7, 1932 |
| 2,293,810 | Domm | Aug. 25, 1942 |
| 2,461,556 | Lorig | Feb. 15, 1949 |
| 2,494,954 | Mason et al. | Jan. 17, 1950 |
| 2,538,317 | Mason et al. | Jan. 16, 1951 |
| 2,643,975 | Neish | June 30, 1953 |
| 2,719,820 | Allen | Oct. 4, 1955 |
| 2,764,542 | Pullen | Sept. 25, 1956 |
| 2,921,893 | Smith | Jan. 19, 1960 |

FOREIGN PATENTS

| | | |
|---|---|---|
| 688,156 | Germany | Feb. 14, 1940 |